United States Patent
Niida et al.

(10) Patent No.: US 6,871,976 B2
(45) Date of Patent: Mar. 29, 2005

(54) WEDGE PLATE TYPE LIGHT GUIDING PLATE FOR FRONT LIGHT

(75) Inventors: Eiki Niida, Kariya (JP); Fumikazu Isogai, Kariya (JP); Yasuya Mita, Kariya (JP); Norihito Takeuchi, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/305,477

(22) Filed: Nov. 27, 2002

(65) Prior Publication Data

US 2003/0103344 A1 Jun. 5, 2003

(30) Foreign Application Priority Data

Nov. 30, 2001 (JP) .......................................... 2001-365746

(51) Int. Cl.[7] .................................................. F21V 7/04
(52) U.S. Cl. ............................. 362/31; 362/27; 362/26; 362/560; 362/23; 349/63; 349/65
(58) Field of Search ............................ 362/31, 26, 560, 362/23, 27; 349/63, 65

(56) References Cited

U.S. PATENT DOCUMENTS 6,663,254 B2 * 12/2003 Ohsumi ....................... 362/31

FOREIGN PATENT DOCUMENTS

| JP | 7-270709 | 10/1995 | ............ G02B/27/00 |
| JP | 8-278760 | 10/1996 | ............ G09F/13/18 |
| JP | 11-242220 | 9/1999 | ......... G02F/1/1335 |
| JP | 2000-21224 | 1/2000 | .............. F21V/8/00 |
| JP | 2000-111900 | 4/2000 | ......... G02F/1/1335 |

* cited by examiner

Primary Examiner—Sandra O'Shea
Assistant Examiner—Bertrand Zeade
(74) Attorney, Agent, or Firm—Morgan & Finnegan, LLP

(57) ABSTRACT

A light guiding plate guides light from a light source and irradiates the light onto a display portion. The light guiding plate has an incidence plane, which permits light to enter the light guiding plate, an opposite and plane opposite to the incidence plane an exit plane facing the display portion, and a reflection-exit plane opposite to the exit plane. A plurality of grooves are formed on the reflection exit plane. In any adjacent pair of the grooves, the depth of the groove closer to the opposite end plane is equal to or greater than the depth of the groove closer to the incidence plane. The depth of the grooves substantially increase from the incidence plane toward the opposite end plane. This improves the uniformity of brightness distribution.

16 Claims, 3 Drawing Sheets

WEDGE PLATE TYPE LIGHT GUIDING PLATE FOR FRONT LIGHT

BACKGROUND OF THE INVENTION

The present invention relates to a wedge plate type light guiding plate for a front light.

To reduce the power consumption, some conventional display units have a lighting device. When there is sufficient outside light such as sunlight or room lighting, this type of display unit uses outside light. When the outside light is insufficient, the display unit uses the lighting device. Such display units include a reflective display unit with a front light. The front light of such a display unit has a light guiding plate. As the light guiding plate, there are a flat plate type and a wedge plate type.

FIG. 6 shows a reflective display unit 50 with a front light. The display unit 50 includes a light source 51, a light guiding plate 52, and a reflective liquid crystal panel 60. The liquid crystal panel 60 is located below the exit plane 53 of the light guiding plate 52. A number of grooves 57 having saw-tooth cross-section are formed on the reflection-exit 55. The light guiding plate 52 admits light through the incidence plane 54. The admitted light is reflected by the light admission plane 57a of each groove 57 and exits the light guiding plate 52 through the exit plane 53.

It is desirable that the brightness distribution of a reflective liquid crystal display unit be uniform. Specifically, light from the light source 51, which is reflected by the grooves 57 and guided to the reflective liquid crystal panel 60, preferably uniformly illuminate the panel 60.

Brightness uniformity is an index representing a brightness distribution. To compute the brightness uniformity, the values of brightness at specific points on the light guiding plate 52 are measured. The brightness uniformity is computed based on the maximum value and the minimum value of the measured brightness. Specifically, the brightness uniformity is computed in the following manner. First, the surface of the light guiding plate 52 is divided into sixteen sections by three parallel lines and another three lines perpendicular to the first three lines. The brightness at each of the nine intersection points L1 to L9 is measured. Then, the minimum brightness is divided by the maximum brightness. The resultant represents the brightness uniformity. The closer to one the resultant is, the smaller the difference between the minimum brightness and the maximum brightness is, that is, the more uniform the brightness distribution is.

However, since the amount of light that reaches regions far from the light source 51 is small, the amount of light reflected by the light admission planes 57a in the region is small. Accordingly, only a small amount of light exits through the exit plane 53 in the regions far from the light source 51. This results in an uneven brightness. In other words, the brightness distribution is uneven. To improve the brightness uniformity, wedge plate type light guiding plates have been proposed (for example, Japanese Laid-Open Patent Publications No. 11-242220 and No. 2000-21224).

A wedge plate type light guiding plate refers to a light guiding plate in which the thickness d1 of the light guiding plate 52 at the incidence plane 54 facing the light source 51 is greater than the thickness d2 of the light guiding plate 52 at the end opposite to the incidence plane 54 (d1>d2) Therefore, the reflection-exit plane 55 is inclined such that the distance between the reflection-exit plane 55 and the exit plane 53 decreases. Compared to flat plate types, grooves 57 far from the light source 51 receives and reflects a larger amount of light from the light source 51 in a wedge plate type light guiding plate. This improves the brightness uniformity.

However, if the thickness d2 of the wedge type waveguide 52 is further reduced to improve the brightness uniformity, the difference between the thickness d1 and d2 is increased. As a result, the inclination angle of the reflection-exit plans 55 is increased. This creates parallax and degrades the visibility.

Another method for improving the brightness uniformity is to vary the pitch or the grooves 57. However, if the pitch does not match the pixel pitch, interference patterns will appear.

SUMMARY OF THE INVENTION

The wedge plate type light guiding plates of the above publications present no measures to overcome these drawbacks.

Accordingly, it is an objective of the present invention to provide a wedge plate type light guiding plate for front light, which light guiding plate improves the uniformity of brightness distribution while preventing the visibility from being degraded and interference patterns from appearing.

To achieve the foregoing and other objectives and in accordance with the purpose of the present invention, the invention provides a wedge plate type light guiding plate for a front light mounted on a reflective display unit having a display portion. The light guiding plate guides light from a light source and irradiates the light onto the display portion. The light guiding plate has an incidence plane, an opposite end plane, an exit plane facing the display portion and a reflection-exit plane. The incidence plane permits light to enter the light guiding plate. The opposite end plane opposites to the incidence plane. Light entering the light guiding plate through the incidence plane exits through the exit plane toward the display portion. The reflection-exit plane opposites to the exit plane. Light reflected on the display portion passes through the exit plane and the reflection-exit plane. A plurality of grooves are formed on the reflection-exit plane. The grooves extend in a direction parallel to the direction in which the incidence plane extends, and are arranged at a predetermined pitch in a direction perpendicular to the direction in which the incidence plane extends. In any adjacent pair of the grooves, the depth of the groove closer to the opposite end plane is equal to or greater than the depth of the groove closer to the incidence plane. The depth of the grooves substantially increases from the incidence plane toward the opposite end plane.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A reflective liquid crystal display unit 1 according to one embodiment of the present invention will now be described with reference to FIGS. 1 to 4.

Figure 1:
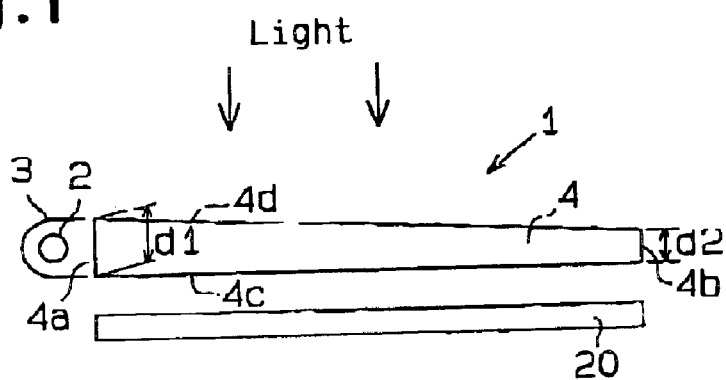
FIG. 1 is cross-sectional view illustrating a reflective liquid crystal display unit according to one embodiment of the present invention.

As shown in FIG. 1, the reflective liquid crystal display unit 1 includes a light source 2, a reflector 3 covering the light source 2, a wedge plate type light guiding plate 4, and a liquid crystal panel 20. A cold cathode tube is used as the light source 2. The inner surface of the reflector 3 is formed with a material of high reflectivity to reflect the light from the light source 2 toward the light guiding plate 4. The light source 2 is arranged to face an incidence plane 4a of the light guiding plate 4.

A high transparency material, for example, an acrylic sheet, is used as the light guiding plate 4. The liquid crystal panel 20 is arranged to face a exit plane 4c of the light guiding plate 4. The cross-section of the light guiding plate 4 perpendicular to the incidence plane 4a is substantially shaped like a wedge. Specifically, the incidence plane 4a is substantially perpendicular to the exit plane 4c. The thickness d1 of the light guiding plate 4 at the incidence plane 4a is greater than the thickness d2 of the light guiding plate 4 at an opposite end plane 4b opposite to the incidence plane 4a (d1>d2). Therefore, the reflection-exit plane 4d is inclined such that the distance between the incidence plane 4c and the reflection-exit plane 4d decreases from the incidence plane 4a toward the opposite end plane 4b.

The liquid crystal panel 20 is rectangular and its size is one to ten inches diagonally.

The inclination angle of the reflection-exit plane 4d relative to the exit plane 4c is small. However, for purposes of illustration, the inclination is exaggerated in FIG. 1.

Figure 2:
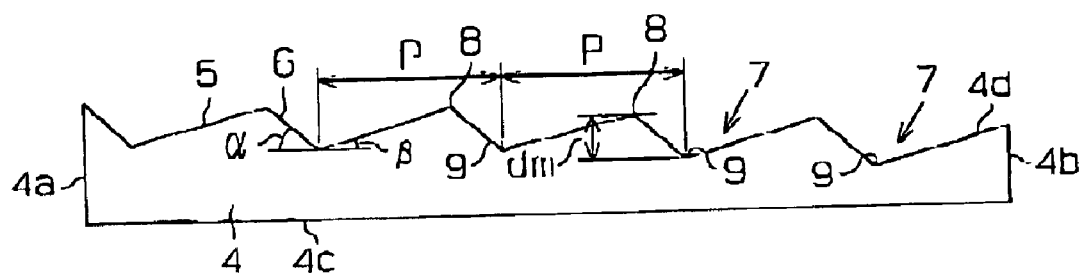
FIG. 2 is a schematic cross-sectional view illustrating the light guiding plate of the display unit shown in FIG. 1.
Figure 3:
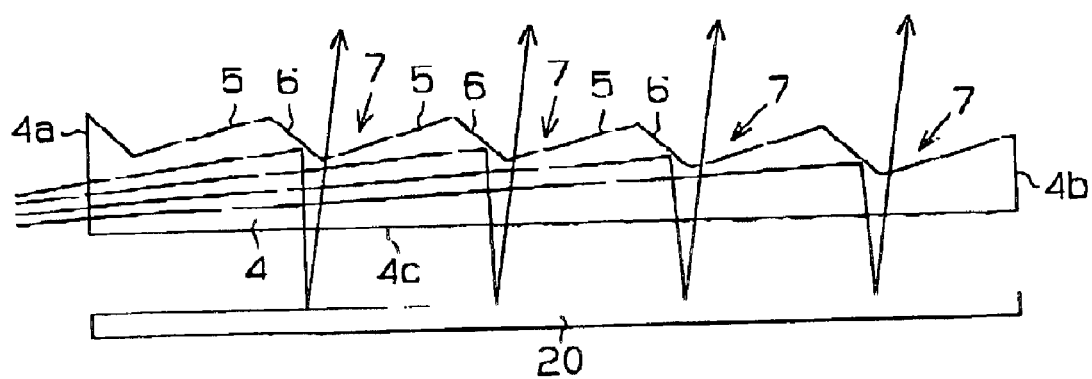
FIG. 3 is a schematic cross-sectional view showing the operation of the light guiding plate shown in FIG. 1.

FIG. 2 is an enlarged cross-sectional view illustrating the light guiding plate 4. As shown in FIG. 2, a number of grooves 7 having a saw-tooth cross-section are formed on the reflection-exit plane 4d. The grooves 7 extend in a direction parallel to the direction in which the incidence plane 4a extends. Each groove 7 has a first inclined plane 5 and a light admission plane 6. The first inclined plane 5 is inclined relative to the exit plane 4c by an angle $\beta$. The light admission plane 6 is inclined relative to the exit plane 4c by an angle $\alpha$. In other words, each inclined plane 5 is substantially parallel to the exit plane 4c. The inclined plane 5 is inclined such that the distance between the inclined plane 5 and the exit plane 4c increases as the distance from the light source 2 increases, or from the incidence plane 4a toward the opposite end plane 4b. The angle $\beta$ is the range of approximately 1° to 5°. Each light admission plane 6 is inclined such that the distance between the light admission plane 6 and the exit plane 4c is decreased as the distance from the light source 2 is increased. The inclination angle $\alpha$ is in the range of 41° to 47°. The light admission planes 6 reflect light from the light source 2 toward the exit plane 4c.

The first and second inclined planes 5, 6 form peaks 8 and bottoms 9. The pitch P of the bottoms 9 is constant. The grooves 7 are arranged at a predetermined pitch P in a direction perpendicular to the direction in which the incidence plane 4a extends. The pitch P preferably matches the pixel pitch of the liquid crystal of the panel 20. The groove depth dm of each groove 7 is defined as the distance between a line that includes the corresponding peak 8 and that is parallel to the exit plane 4c and a line that includes the bottom 9 and that is parallel to the exit plane 4c. The groove depth dm gradually increases from the incidence plane 4a toward the opposite end plane 4b. The line that includes the peaks 8 on a cross-section perpendicular to the incidence plane 4a is a curve that approaches the exit plane 4c as the distance from the light source 2 increases.

The groove depth dm of each adjacent pair of the grooves 7 is determined not to decrease, or such that the depth dm of the groove 7 closer to the opposite end plane 4b is equal to or greater than the depth dm of the groove close to the incidence plane 4a. Preferably, the groove depth dm monotonously increases from the side corresponding to the incidence plane 4a. More preferably, the groove depth dm is increased by one of two- to five-dimensional functions. Most preferably, the groove depth dm is increased by a three-dimensional function.

In this embodiment, an increase of the groove depth dm by an n-dimensional function refers to a configuration in which the groove 7 closet to the incidence plane 4a is set as a reference point and the groove depth dm increases from the depth of the reference point groove 7 by an amount that is proportional to nth power of the distance from the reference point. That is, when the distance from the groove 7 closest to the incidence plane 4a is denoted by x, and the depth of the groove 7 closest to the incidence plane 4a is denoted by b, the relationship between the groove depth dm and the distance x is represented by the equation $(dm=ax^n+b)$. a is a coefficient and has a positive value. n need not be an integer but may be a real number.

Therefore, when the groove depths dm of three consecutive grooves 7 are measured, the difference between the depth dm of the groove 7 closest to the opposite end plane 4b and the middle groove 7 is greater than the difference between the depth dm of the middle groove 7 and the groove 7 closest to the incidence plane 4a. Preferably, the rate of charge between the depth dm of a groove 7 closer to the incidence plane 4a and the adjacent groove 7 closer to the opposite end plane 4b is less than 2%. More preferably, the rate of change is 0.4% or less The pitch P is 1 mm or less. However, for purposes of illustration, the pitch P is exaggerated in FIG. 2. Therefore, in reality, a number of the grooves 7 are formed on the light guiding plate 4. Likewise, for purposes of illustration, the ratio of the groove depth dm relative to the thickness of the light guiding plate 4 is exaggerated. Also, the rate of change of the groove depth dm, that is, the difference between a groove 7 and adjacent grooves 7 are exaggerated.

The operation of the above display unit 1 will now be described.

When there is sufficient outside light such as sunlight or room lighting, the display unit 1 uses the outside light. When the outside light is insufficient, the display unit 11 uses the light source 2. As shown in FIG. 1, the outside light enters the light guiding plate 4 through the reflection-exit plane 4d.

The outside light then exits the light guiding plate 4 through the exit plane 4c and is irradiated onto the liquid crystal panel 20.

When light from the light source 2 enters the light guiding plate 4 through the incidence plane 4a, the light advances through the light guiding plate 4. Light that reaches each light admission plane 6 is totally reflected at an angle that is close to an right angle relative to the exit plane 4c and exits through the exit plane 4c. The light admission planes 6 totally reflect not only the light directly from the light source 2, but also light that has been totally reflected by the exit plane 4c, and light that has been totally reflected by the first inclined planes 5. Further, the light admission planes 6 totally reflect light that enters the waveguide 4 after being reflected by the reflector 3 instead of directly entering through the incidence plane 4a.

The light irradiated onto the liquid crystal panel 20 is reflected by the panel 20 and reenters the light guiding plate 4. The light then passes through the light guiding plate 4 and exits the light guiding plate 4 through the reflection-exit plane 4d. The light then becomes visible.

As the distance from the light source 2 increases, the amount of light advancing through the light guiding plate 4 decreases. However, since the groove depth dm is configured not to decrease toward the opposite end plane 4b, the area of the light admission planes 6 in regions far from the light source 2 is large. Thus, a sufficient amount of light is reflected by the light admission planes 6.

EXAMPLE

An example will now be described. In this example, a wedge plate type light guiding plate 4 that has a length of 65 mm, a width of 80 mm, a maximum thickness d1 of 1 mm, and a minimum thickness d2 of 0.7 mm, a pitch P of 0.24 mm was prepared. The prepared light guiding plate 4 had saw-tooth cross section grooves 7 having an inclination angle α of approximately 44°, and an inclination angle β of approximately 1.5°. The groove depth dm was configured to gradually increase from 5.5 μm to 11 μm. The maximum rate of change between an adjacent pair of the grooves 7 was set to 0.4%.

Experiments in which the groove depth dm was varied were performed. When the rate of change was 2% or less, the lines of the grooves 7 were not visible. When the maximum rate of change was 0.4%, the lines were not visible as a matter of course.

Figure 4:
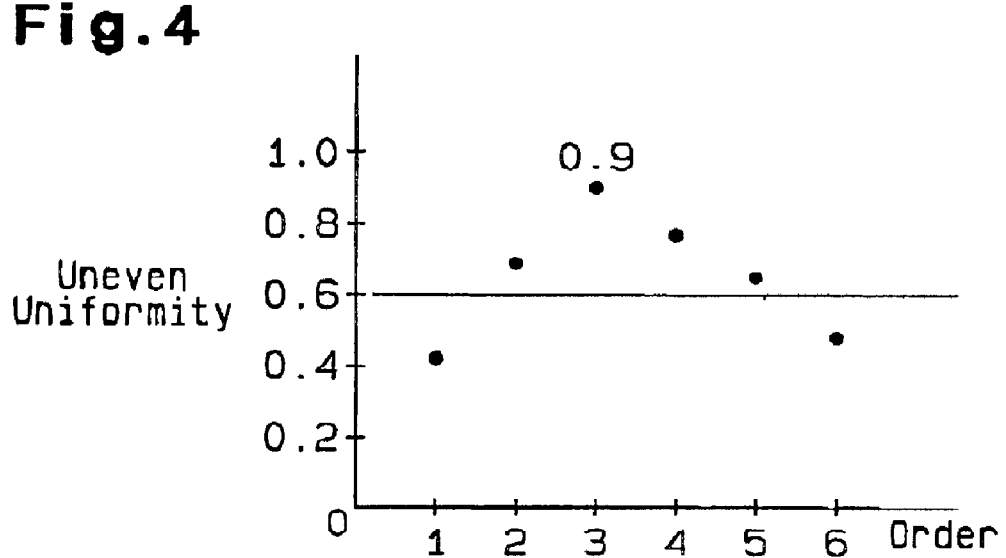
FIG. 4 is a graph showing the relationship between an order of functions by which the groove depth is changed and the brightness uniformity of the light guiding plate shown in FIG. 1.

The groove depth dm of the grooves 7 was varied in various manners. Specifically, the depth was increased from the groove 7 closest to the incidence plane 4a toward the opposite end plane 4b by one- to six-dimensional functions. The brightness uniformity in these cases were compared. The results are shown in FIG. 4. In the graph of FIG. 4, the horizontal axis represents the order of the dimension of the functions, and the vertical axis represents the brightness uniformity.

As the results shown in FIG. 4, the brightness uniformity was maximum when the groove depth dm increased by a three-dimensional function. The brightness uniformity is satisfactory as long as it is 0.6 or higher. Therefore, the groove depth dm preferably increases by one of two- to five-dimensional functions. That is, the groove depth dm of the grooves 7 preferably increases from the groove 7 closest to the incidence plane 4a toward the opposite end plane 4b by one of two- to five-dimensional functions. More preferably, the groove depth dm is increased by a three-dimensional function. In this case, the brightness uniformity is maximized and the visibility is optimized.

This embodiment provides the following advantages.

(1) In the wedge plate type waveguide 4, the pitch P is constant and the groove depth dm does not decrease. Thus, in regions far from the light source 2, a sufficient amount of light exits through the exit plane 4c. Therefore, the brightness is not degraded and the distribution of the brightness is made uniform since the pitch P is constant, a uniform brightness distribution will not cause interference patterns to be created by light reflected by the liquid crystal panel 20 and light reflected by the exit plane 4c.

(2) The groove depth dm monotonously increases. That is, there is no range in which the groove depth dm is constant, and the groove depth dm increases as the distance from the light source 2 increases. The amount of light that reaches regions farther from the light source 2 is less than the amount of light that reaches regions closer to the light source 2. However, since the groove depth dm increases as the distance from the light source 2 increases, the brightness distribution is made uniform.

(3) The rate of change of the groove depth dm is determined not to decrease from the incidence plane 4a to the opposite end plane 4b. In other words, the groove depth dm is increased as the distance from the light source 2 is increased. That is, the groove depth dm is increased according to decrease in the amount of light. Therefore, the brightness distribution is made uniform.

(4) Since the groove depth dm is changed by one of two- to five-dimensional functions, the brightness distribution is made uniform and the visibility is improved.

(5) If the groove depth dm is changed by a three-dimensional function, the brightness distribution is made most uniform. Therefore, the visibility is optimized.

(6) If the rate of change of the groove depth dm is 2% or less in an adjacent pair of the grooves 7, the brightness is not changed abruptly. Therefore, the lines of the grooves 7, which would be visible due to abrupt changes of the brightness, are substantially invisible. Preferably, if the rate of change is 0.4% or less, the lines will be less visible.

It should be apparent to those skilled in the art that the present invention may be embodied in many other specific forms without departing from the spirit or scope of the invention. Particularly, it should be understood that the invention may be embodied in the following forms.

As long as the depth dm of the grooves 7 substantially increases from the position closest to the incidence plane 4a toward the opposite end plane 4b, there may be a part where depths of an adjacent pair of the groove 7 are the same.

The light source 2 is not limited to the cold cathode tube. The light source 2 may be a hot cathode tube such as a fluorescent tube or incandescent lamp, or a plurality of light emitting diodes (LEDs). Alternatively, a linear light source having a point light source may be used. This linear light source has an LED as a point light source and a light guiding body to convert the light from the light source to a linear light. However, it is preferable that the light source 2 be a cold cathode tube or an LED, which produce a relatively small amount of heat.

The light guiding plate 4 is not limited to an acrylic sheet. As long as the waveguide 4 is transparent, a transparent resin or glass may be used.

The reflection-exit plane 4d may have flat sections. That is, the peaks 8 may be flattened.

Instead of the pitch of the bottoms 9, the pitch of the peaks 8 may be constant.

The pitch P is not limited to 0.24 mm. The pitch P may be changed in accordance with the pixel pitch of the liquid crystal panel 20 if necessary. The pitch P need not be exactly the same as the pixel pitch, but may be different from the pixel pitch as long as interference patterns are not shown.

Figure 5A:
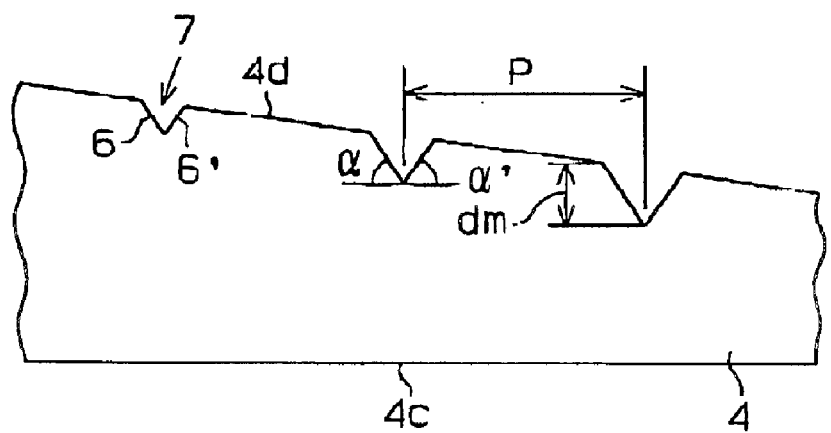
FIG. 5(a) is a schematic cross-sectional illustrating a light guiding plate having V-shaped grooves according to another embodiment.
Figure 5B:
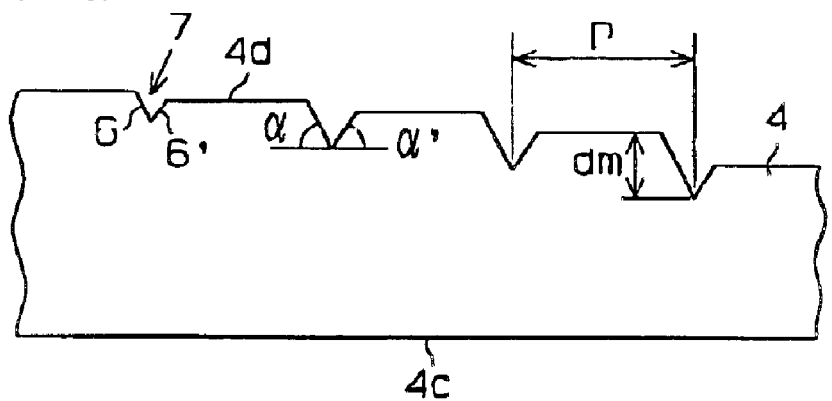
FIG. 5(b) is a schematic cross-sectional illustrating a light guiding plate having V-shaped grooves according to a further embodiment.
Figure 6:
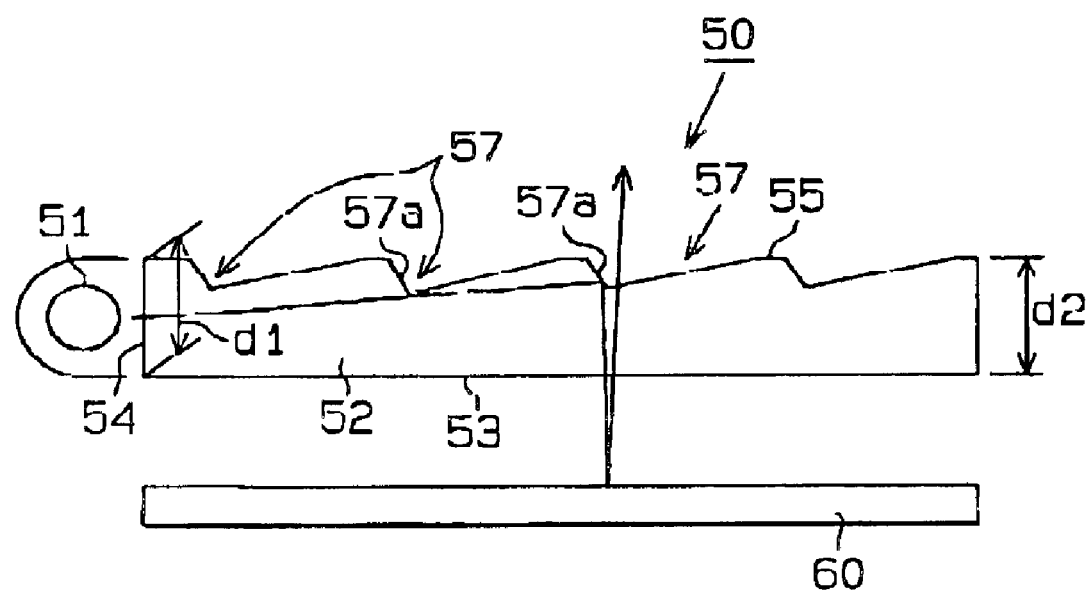
FIG. 6 is a schematic cross-sectional view showing a prior art reflective liquid crystal display unit.
Figure 7:
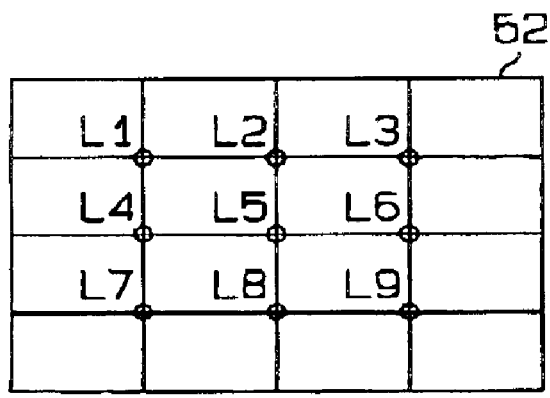
FIG. 7 is a diagram showing brightness distribution.

The grooves 7 need not have saw-tooth shaped cross-section, but may have V-shaped cross-section. As shown in FIG. 5(a), a number of V-shaped grooves 7 may be formed on the inclined reflection-exit plane 4d. Each V-shaped groove 7 has a light admission plane 6 and a second light admission plane 6'. The angle α defined by the light admission plane 6 and the exit plane 4c, and the angle α' defined by the second light admission plane 6' and the exit plane 4c are both in the range of 41° to 47°. As shown in FIG. 5(b), the reflection exit plane 4d may be formed such that the distance from the exit plane 4c discretely decreases, and a number of V-shaped grooves 7 may be formed on the reflection-exit plane 4d. The angle α and the angle α' are preferably but not limited to the same angle.

In the configurations in FIGS. 5(a) and 5(b), light that has been reflected by the opposite end plane 4b is reflected by the second light admission planes 6' and guided to the exit plane 4c, which increases the brightness. The opposite end plane 4b may function as a reflector for reflecting light from the light source 2. This increased the amount of light reflected by the liquid crystal panel 20 and thus increases the brightness. The reflector may be formed by evaporating aluminum or silver onto the opposite end plane 4b. Alternatively, the reflector may be formed by attaching a reflector film onto the opposite end plane 4b.

The angles α and β need not be constant. As long as the pitch P is constant and the groove depth dm does not decrease toward the opposite end plane 4b, the angle β may have any value between approximately 1° to 5°, and the angle α may have any value 41° to 47°.

The groove depth dm is not necessarily increased by one of two- to five-dimensional functions. However, the groove depth dm may be increased by a combination of the two- to five dimensional functions. That is, the groove depth dm and the distance x may satisfy the following equation. $dm = ax^n + bx^{(n-1)} + cx^{(n-2)} + \ldots + dx^2 + ex + f$. Further, any function that increases the groove depth dm from the incidence plane 4a toward the opposite end plane 4b may be used. In this case, the rate of change of the difference between depths dm of adjacent pairs of the grooves 7 can have a minimum value and thus does not monotonously increase. However, since the depths dm of any adjacent pair of the grooves 7 is always different, the depth dm increases as the distance from the light source 2 increases. Thus, the modification has the same advantages as the illustrated embodiment.

When the groove depth dm is changed by any of two- to five-dimensional functions, the groove depth dm need not be increased by one of two- to five-dimensional functions in the entire range from the incidence plane 4a to the opposite end plane 4b. That is, the reflection-exit plane 4d may be divided into sections, and the groove depth dm may be increased by a different function in each section. For example, the groove depth dm may be increased by a two-dimensional function in the sections closest to the incidence plane 4a, and the order of the function my be increased to three and then to four as the distance from the incidence plane 4a increases.

The groove depth dm of some of the grooves 7 need not change by two- to five-dimensional functions, as long as the groove depth dm of most of the grooves 7 change by any of two- to five-dimensional functions from the incidence plane 4a toward the opposite end plane 4b.

The thickness d1, the thickness d2, the pitch P, and the groove depth dm are not limited to the values in the example.

The present invention may be applied to reflective display units other than the reflective liquid crystal display unit 11. For example, the present invention may be applied to a reflective display unit to illuminate photographs.

Instead of inclining the reflection-exit plane 4d, the exit plane 4c may be inclined. In this ease, the reflection-exit plane 4d is parallel to the liquid crystal panel 20 and is substantially perpendicular to the incidence plane 4a. The exit plane 4c is inclined to approach the reflection-exit plane 4d from the surface facing the light source 2 (incidence plane 4a) to the opposite end plane 4b.

Therefore, the present examples and embodiments are to be considered as illustrative and not restrictive and the invention is not to be limited to the details given herein, but may be modified within the scope and equivalence of the appended claims.

What is claimed is:

1. A wedge plate type light guiding plate for a front light mounted on a reflective display unit having a display portion, wherein the light guiding plate guides light from a light source and irradiates the light onto the display portion, the light guiding plate comprising:

an incidence plane, which permits light to enter the light guiding plate;

an opposite end plane opposite to the incidence plane;

an exit plane facing the display portion, wherein light entering the light guiding plate through the incidence plane exits through the exit plane toward the display portion; and a reflection-exit plane opposite to the exit plane, wherein light reflected on the display portion passes through the exit plane and the reflection-exit plane, wherein a plurality of grooves are formed on the reflection-exit plane, wherein the grooves extend in a direction parallel to the direction in which the incidence plane extends, and are arranged at a predetermined pitch in a direction perpendicular to the direction in which the incidence plane extends, and wherein, in any adjacent pair of the grooves, the depth of the groove closer to the opposite end plane is greater than the depth of the groove closer to the incidence plane, and wherein the depth of the grooves substantially increases toward the opposite end plane.

2. The light guiding plate according to claim 1, wherein, in any consecutive three of the grooves, the difference between the depth of the groove closest to the opposite end plane and the depth of the middle groove is equal to or greater than the difference between the depth of the middle groove and the depth of the groove closest to the incidence plane.

3. The light guiding plate according to claim 1, wherein, in any adjacent pair of the grooves, the rate of increase of the depth of the groove closer to the opposite end plane to the depth of the groove closer to the incidence plane is less than 2%.

4. The light guiding plate according to claim 3, wherein the rate of increase is equal to or less than 0.4%.

5. The light guiding plate according to claim 1, wherein, if the depth of a groove at a given position is denoted by dm, the distance between the groove closest to the incidence plane and the given position is denoted by x, and the depth of the groove closest to the incidence plane is denoted by b, the relationship between the depth dm of the groove and the distance x satisfies an equation $dm = ax^n + b$, in which a is a coefficient, and n is an order of function.

6. The light guiding plate according to claim 5, wherein n is three.

7. A light guiding plate for a front light mounted on a reflective display unit having a display portion, wherein the light guiding plate guides light from a light source and irradiates the light onto the display portion, the light guiding plate comprising:
- an incidence plane, which permits light to enter the light guiding plate;
- an opposite end surface opposite to the incidence plane;
- an exit plane facing the display portion, wherein light entering the light guiding plate through the incidence plane exits through the exit plane toward the display portion; and
- a reflection-exit plane opposite to the exit plane, wherein light reflected on the display portion passes through the exit plane and the reflection-exit plane, wherein a plurality of grooves are formed on the reflection-exit plane, wherein the grooves extend in a direction parallel to the direction in which the incidence plane extends, and are arranged at a predetermined pitch in a direction perpendicular to the direction in which the incidence plane extends, and wherein the depth of the grooves increases from the incidence plane toward the opposite end plane.

8. The light guiding plate according to claim 7, wherein, in any consecutive three of the grooves, the difference between the depth of the groove closest to the opposite end plane and the depth of the middle groove is equal to or greater than the difference between the depth of the middle groove and the depth of the groove closest to the incidence plane.

9. The light guiding plate according to claim 7, wherein, in any adjacent pair of the grooves, the rate of increase of the depth of the groove closer to the opposite end plane to the depth of the groove closer to the incidence plane is less than 2%.

10. The light guiding plate according to claim 9, wherein the rate of increase is equal to or less than 0.4%.

11. The light guiding plate according to claim 7, wherein, if the depth of a groove at a given position is denoted by dm, the distance between the groove closest to the incidence plane and the given position is denoted by x, and the depth of the groove closest to the incidence plane is denoted by b, the relationship between the depth dm of the groove and the distance x satisfies an equation $dm = ax^n + b$, in which a is a coefficient, and n is an order of function.

12. The light guiding plate according to claim 11, wherein n is three.

13. The light guiding plate according to claim 1, wherein the depth of the grooves is increased by one of two to five dimensional functions.

14. The light guiding plate according to claim 1, wherein each groove has a first inclined plane and a light admission plane, wherein the first inclined plane is inclined relative to the exit plane by an angle $\beta$, wherein the light admission plane is inclined relative to the exit plane by an angle $\alpha$, and wherein the angle $\beta$ is in the range of approximately 1° to 5° and the inclination angle $\alpha$ is in the range of 41° to 47°.

15. The light guiding plate according to claim 7, wherein the depth of the grooves is increased by one of two to five dimensional functions.

16. The light guiding plate according to claim 7, wherein each groove has a first inclined plane and a light admission plane, wherein the first inclined plane is inclined relative to the exit plane by an angle $\beta$, wherein the light admission plane is inclined relative to the exit plane by an angle $\alpha$, and wherein the angle $\beta$ is in the range of approximately 1° to 5° and the inclination angle $\alpha$ is in the range of 41° to 47°.

* * * * *

UNITED STATES PATENT AND TRADEMARK OFFICE
CERTIFICATE OF CORRECTION

PATENT NO.     : 6,871,976 B2
DATED          : March 29, 2005
INVENTOR(S)    : Eiki Niida et al.

It is certified that error appears in the above-identified patent and that said Letters Patent is hereby corrected as shown below:

Column 2,
Line 8, delete "plans" and insert therefore -- plane --.

Column 4,
Line 31, delete "closet" and insert therefore -- closest --.
Line 49, delete "charge" and insert therefore -- change --.

Column 6,
Line 7, delete "uniform since" and insert therefore -- uniform. Since --.

Signed and Sealed this

Sixth Day of September, 2005

JON W. DUDAS
*Director of the United States Patent and Trademark Office*